Oct. 4, 1960  F. P. BALDWIN ET AL  2,955,103
PROCESS OF BROMINATING BUTYL RUBBER WITH ELEMENTAL
BROMINE IN AN AlCl$_3$ TREATED HYDROCARBON SOLVENT
Filed Dec. 3, 1956  2 Sheets-Sheet 1

Francis P. Baldwin
Samuel B. Robison    Inventors

By  *W. H. Smyers*   Attorney

Oct. 4, 1960 F. P. BALDWIN ET AL 2,955,103
PROCESS OF BROMINATING BUTYL RUBBER WITH ELEMENTAL
BROMINE IN AN AlCl₃ TREATED HYDROCARBON SOLVENT
Filed Dec. 3, 1956 2 Sheets-Sheet 2

Francis P. Baldwin
Samuel B. Robison    Inventors

By W. H. Smyers    Attorney

United States Patent Office 2,955,103
Patented Oct. 4, 1960

2,955,103

PROCESS OF BROMINATING BUTYL RUBBER WITH ELEMENTAL BROMINE IN AN $AlCl_3$ TREATED HYDROCARBON SOLVENT

Francis P. Baldwin, Colonia, and Samuel B. Robison, Roselle, N.J., assignors to Esso Research and Engineering Company, a corporation of Delaware Filed Dec. 3, 1956, Ser. No. 625,638

5 Claims. (Cl. 260—85.3)

This invention relates to the production of substantially gel-free bromine-containing olefine-multiolefin-containing copolymers, particularly brominated butyl rubber. The invention also relates to the production of compositions containing such bromine-containing copolymers as above which are useful in coatings for natural or synthetic fibrous materials, such as cotton, rayon, nylon, etc., to improve their adhesion to rubbery polymers, i.e., natural rubber or especially synthetic rubbers such as GR–S rubber, Buna-N rubber, chloroprene rubber, and preferably butyl rubber or halogenated butyl rubber. The present invention further relates to the resulting novel, substantially gel-free, unsaturated olefin-multiolefin brominated copolymers, particularly brominated butyl rubber, to coating compositions containing such brominated polymers as brominated butyl rubber, and to improved vulcanizates and covulcanizates obtained by curing the same in the absence of presence of such other rubbery polymers as abovementioned.

The instant invention further involves the use of compositions comprising substantially gel-free brominated butyl rubber in obtaining improved adhesion between a rubber and fibrous filaments, cords, threads, fabrics, etc., particularly in the presence of phenolic-aldehyde resins; as well as to the novel rubber-fibrous composites produced by the aforesaid process which will be more fully described hereinafter. The present invention is a continuation-in-part of U.S. patent application Serial No. 553,-830, filed December 19, 1955, in the names of Francis P. Baldwin and Samuel B. Robison.

The invention will be best understood from the following description when read in connection with the accompanying drawings wherein.

Figure 1:
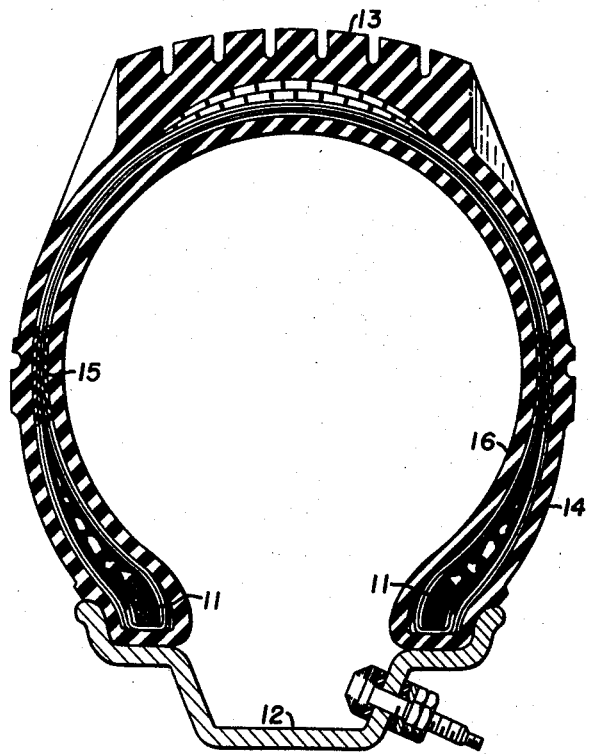
Fig. 1 is a vertical section of a pneumatic tubeless tire employing therein a modified copolymer in accordance with the present invention.

It is known that butyl rubber and similar olefin-multi-olefin copolymers or tripolymers with small amounts of vinyl aromatic compounds may be milled with a solid brominating agent at elevated temperatures to obtain products which exhibit increase compatibility and covulcanizability with the more highly unsaturated rubbers such as GR–S, Buna-N, or natural rubber. However, the foregoing hot milling invariably causes degradation of the butyl rubber copolymer, resulting in low molecular weight and the production of very large amounts of undesirable gel. The production of low molecular weight copolymer is undesirable because of correspondingly decreased physical properties, such as tensile strength and extension modulus of vulcanizates containing the same. The production of any substantial quantities of gel is likewise disadvantageous, particularly in making rubber cements and may impair processing and finishing operations, particularly of the compounded brominated copolymer.

The foregoing disadvantages are accentuated if there are employed such common solid brominating agents as N-bromo-succinimide, bromohydantoins, or the like, which, being oxidizing catalysts, may contaminate the brominated copolymer with oxygenated organic compounds. Also, substantially all solid brominating agents leave a residue in the polymer which is deleterious in such instances when the brominated rubber is used as electrical insulation, rubber gaskets for food containers, and applications where any substantial moisture absorption is undesirable.

In accordance with the present invention, the foregoing disadvantages are overcome and substantially gel-free brominated butyl rubber or other similar brominated olefin-multiolefin copolymers, are produced which have high molecular weights. This is accomplished by reacting dissolved, unvulcanized butyl rubber with bromine at a temperature level of between about −30° and about +100° C. and preferably between about 20° and about 70° C. (e.g., room temperature) for a time (e.g., about 1 to 60 minutes) until the polymer contains at least about 0.5 wt. percent of combined bromine but not more than about 3 atoms of bromine combined in the polymer per molecule of multiolefin present therein; i.e., not more than about 3 gram atoms of combined bromine per mole of double bonds in the polymer. The bromine may be used in gaseous form, dissolved in an inert liquid solvent, or preferably in liquid form (e.g., elemental liquid bromine).

It is a further discovery of the present invention that when rubbery olefin-multiolefin copolymers and, particularly, olefin-multiolefin (and/or isoolefin-multiolefin) copolymers of the type of butyl rubber, are partially brominated in accordance with the foregoing disclosure, higher molecular weight polymers are obtained if the solvent in which the rubber is dissolved during bromination is unreactive with bromine and is preferably substantially saturated. The substantially saturated solvent is preferably a hydrocarbon solvent and especially a paraffinic hydrocarbon-type solvent. In the instances where it is desired to convert a partially unsaturated solvent into a substantially saturated solvent by removing olefinic materials, such olefins may be stripped out by fractionation, may be treated with such chemicals as aluminum chloride, or the solvent may be directly hydrogenated to accomplish the same purpose. Particularly outstanding results have been obtained by employing aluminum chloride treated $C_5$ to $C_7$ and especially $C_6$ fractions of virgin naphthas. It has been found that when the bromine number of the solvent is below about 0.2, advantageously below about 0.1, and even more especially below about 0.05, surprisingly high molecular weight brominated polymers are produced when otherwise operating in accordance with the present invention as outlined above and more fully disclosed hereinafter.

In practicing the present invention, the bromination of an olefin-multiolefin copolymer is accomplished by preparing a solution of the copolymer as above, in a suitable inert liquid organic solvent such as an inert hydrocarbon or advantageously halogenated derivatives of saturated hydrocarbons, examples of which are hexane, heptane, saturated petroleum streams, benzene, chlorobenzene, chloroform, trichloroethane, carbon tetrachloride, etc. There is then added to the solution formed, elemental bromine which is preferably in liquid form but may be either in gaseous form or dissolved in an alkyl halide, carbon tetrachloride, etc. In any case, the use of elevated or depressed pressures is optional since atmospheric pressure is satisfactory. The pressures may vary from about 1 to about 400 p.s.i.a., depending upon the foregoing temperatures as well as the reaction time, which is generally from about a few seconds to several hours or more.

It is a particular feature of the present invention to coat tire cords with a phenolic-aldehyde resin and a brominated butyl rubber produced as outlined above and as more fully described hereinafter so that the rubber contains at least about 0.5 wt. percent, and preferably at least about 2.0 wt. percent of combined bromine but not more than about 0.5 N to 3.0 N wt. percent combined bromine and preferably not more than about 1.0 N to about 1.5 N wt. percent combined bromine wherein $$N = \frac{79.92L}{(100-L)M_1 + L(M_2 + 79.92)} \times 100$$

and

L = mole percent of the multiolefin and the polymer
$M_1$ = molecular weight of the isoolefin
$M_2$ = molecular weight of the multiolefin
79.92 = atomic weight bromine The phenolic-aldehyde resins which are within the purview of the present invention may be generally defined as belonging to the class of heat-hardening phenol-aldehyde type resins, preferably resins from phenolic compounds which, prior to heat-hardening or thermosetting are water-soluble at least to the extent of 5-10% or more. Such resins are capable of thermally setting in the absence of any added catalysts at temperatures of about 150°-450° F., temperatures of 200°-300° F. being preferred for coating rayon, whereas higher temperatures of say about 350°-425° F. are permissible for nylon.

As phenolic compounds capable of producing resins of the abovementioned characteristics, mono or especially dihydroxy benzenes are satisfactory. Dihydroxy benzenes having the hydroxyl groups meta or para with respect to each other are preferred. Satisfactory phenolic compounds include phenol, cresols, phloroglucinol, xylenols, trimethyl phenols, mono or dichloro phenols, diamyl or diisopropyl phenols, p-tertiary butyl phenol, p-phenyl-phenol, hydroquinone, and especially resorcinol.

The preferred aldehydes for reaction with the above phenolic compounds include formaldehyde or a material, such as paraformaldehyde, supplying formaldehyde. Other suitable aldehydes include acetaldehyde, propionaldehyde, furfural, etc. The ratio of the phenolic compound to the aldehyde, as abovementioned, is preferably such that the resin, prior to thermosetting, has substantial water solubility as well as solubility in polar solvents. In order to produce the desired resin, the use of a small amount of an alkali metal-containing catalyst or other condensing agent is preferred. If sodium hydroxide is employed, it is advantageously present in amounts of about 0.02 to 0.5 percent by weight, based on reactants.

For the purposes of the present invention, the olefin-multiolefin copolymers brominated as outlined above in accordance with the present invention, generally comprise copolymers containing about 85 to 99.5 wt. percent of a $C_4$ to $C_8$ olefin, or especially an isoolefin such as isobutylene, 2-methyl-1-butene or 3-methyl-1-butene, the remainder of the copolymer reaction product being a $C_4$ to $C_{14}$, and preferably a $C_4$ to $C_6$ multiolefin, such as butadiene, dimethylbutadiene, piperylene, or especially isoprene. The preparation of butyl type rubbery copolymers falling within the above category is described in U.S. Patent 2,356,128 to Thomas et al. and also in other patents as well as in technical literature. As shown in that patent, such copolymers have an iodine number (Wijs) of about 1 to 50 and a molecular weight (Staudinger) of at least 15,000.

Other copolymers suitable for the purposes of the present invention include copolymers of 4-methyl-1-pentene, 2-ethyl-1-butene, 4-ethyl-1-pentene, or the like, as well as isobutylene, 2-methyl-1-butene, or 3-methyl-1-butene, with the following multiolefins or their equivalent:

(1) Acyclic or open-chain conjugated diolefins such as 3-methyl pentadiene-1,3; hexadienes; 2-neopentyl-butadiene-1,3; and the like;

(2) Alicyclic diolefins, both conjugated and non-conjugated such as 1-vinyl cyclohexene-3, 1-vinyl cyclobutene-2, dicyclopentadiene, diolefinic terpenes such as dipentene, terpinenes, terpinoline, phellandrenes, sylvestrene and the like;

(3) Acyclic triolefins such as 2,6-dimethyl-4-methylene-2,5; 2-methyl hexatriene-1,3-5 and other conjugated triolefins such as ocimene;

(4) Alicyclic triolefins such as fulvene; 6,6-dimethyl fulvene; 6-phenyl fulvene; tertiary alkyl fulvenes; 1,3,3-trimethyl-6-vinylcyclohexadiene-2,4; cycloheptatriene; etc.; and (5) Higher multiolefins such as 6,6-vinyl methyl fulvene (a tetraolefin) and 6,6-diisopropenyl fulvene (a pentaolefin).

Other polymers within the purview of the present invention include copolymers of isoolefins, multiolefins and a third or even a fourth monoolefinic compound containing an aromatic nucleus such as styrene, alpha methyl styrene, p-methyl styrene, p-chlorostyrene, dichlorostyrene, etc. The amount of the monoolefinic compound employed is in a minor proportion based on total reacting monomers and is preferably employed in amounts such that between about 0.05 and 20.0 wt. percent and especially between about 0.1 and 5.0 wt. percent, of the monoolefinic aromatic compound is combined in the resulting copolymer.

In a specific embodiment of the present invention, fibrous materials such as tire cords are first passed through an aqueous solution of a phenolic-aldehyde type resin such as resorcinol-formaldehyde resin, having a mole ratio of the phenolic compound to the aldehyde of about 1:1 to about 1:5, and subsequently dried. The concentration of the resin in the solvent is preferably between about 0.5 to about 10.0%, based on total solution of resin.

The resulting resin-coated cord is then dipped into a solution of brominated butyl rubber or preferably calendered at a temperature level of between about 125° F. to 300° F. with a brominated butyl rubber formulation in which 100 parts by weight of the brominated butyl rubber have been compounded into a composition comprising:

| Component | Parts by Weight | | |
|---|---|---|---|
| | General Range | Typical Range | Preferred Range |
| Mold release agent (e.g. stearic acid) | 0-10 | 0.1-5 | 0.3-2.0 |
| Phenol Dialcohol resin (e.g. 2,6-dimethylol-4-isooctyl phenol resin) | 0-20 | 0.1-15.0 | 0.5-10.0 |
| Pigment (e.g. carbon black) | 0-150 | 10-100 | 20-60 |
| Basic Metal Compound (e.g. zinc oxide) | 1-50 | 2-30 | 5-20 |
| Anti-Oxidant (e.g. phenyl beta naphthylamine) | 0-5 | 0.1-2.0 | 0.2-0.6 |
| N-substituted thiocarbamic acid derivative (e.g. tetramethyl thiuram disulfide) | 0-5 | 0.05-3.0 | 0.1-2.0 |

The brominated butyl rubber cement preferably contains about 25 grams of the above total composition (i.e., including brominated butyl rubber and compounding agents) wherein the rubber is dissolved in about 100–500 cc., and preferably in about 150–300 cc., of a rubber solvent such as kerosene, naphtha, straight run mineral spirits, gasoline, hexane, heptane, benzene, toluene, ethyl chloride, chloroform, carbon tetrachloride, etc.

The cords, treated as above described, are then dried at temperatures above about 150° F., preferably above 200° F., e.g. 225° F. The cords may then be embedded in an unvulcanized rubber such as butyl rubber, natural rubber, chlorinated butyl rubber, GR–S rubber (a rubbery diene-styrene copolymer such as butadiene-styrene copolymers), Buna-N rubber (a rubbery diene-nitrile copolymer such as butadiene-acrylonitrile copolymers), chloroprene rubber, etc., and vulcanized advantageously with sulfur and/or a primary or polyfunctional amine and/or especially zinc oxide with or without the addition of minor proportions of N-substituted thiocarbamic acid derivatives, at a temperature level of about 200° to 450° F., advantageously at 250° to 400° F., and preferably 300° to 375° F., for about one minute up to several hours or more to produce a finished article having an improved bond between the coated cords and rubber.

The above procedure produces superior articles suitable for use in constructing tire carcasses for automobiles, trucks, airplanes, etc., as well as numerous other uses such as conveyor belts and other products built up of a plurality of laminations of cord and butyl rubber, etc., the invention being especially applicable to such products which have at least one layer which is of butyl rubber. The invention may also be applied in uses involving merely a single layer of fabric such as nylon, cotton, rayon, silk, etc., which may be either coated on one side or both sides, with a phenolic-aldehyde resin and brominated butyl rubber as described above.

The cure of the finished articles may be not only in the presence of sulfur or sulfur-containing vulcanization agents and/or primary or polyfunctional amines and/or especially zinc oxide, but also in the presence of p-dinitrosobenzene, p-quinone dioxime, p-quinone dioxime dibenzoate, tellurium diethyl dithiocarbamate, and/or especially polyalkyl thiuram sulfides such as tetramethyl thiuram disulfide, etc.

In order to more fully illustrate the present invention, the following experimental data are given.

*Example 1*

A run was made brominating butyl rubber. The butyl rubber employed in all instances was a commerial butyl rubber corresponding to GR–I 17 rubber. The rubber was an isobutylene-isoprene copolymer having 2.2 weight percent isoprene, an 8 minute Mooney viscosity at 212° F. of 67, a mole percent unsaturation of 1.7, and a viscosity average molecular weight of 390,000.

The bromination of a 13 weight percent solution of the above uncured butyl rubber was conducted in accordance with the present invention in a 50-gallon glass-lined Pfaudler reactor equipped with agitator and baffle.

The solvent for the butyl rubber was as follows:

| Component: | Volume percent |
|---|---|
| 2,2-dimethyl butane | 0.10 |
| 2,3-dimethyl butane | 2.40 |
| 2-methyl pentane | 10.75 |
| 3-methyl pentane | 12.45 |
| n-Hexane | 43.50 |
| Methylcyclopentane | 20.5 |
| 2,2-dimethyl pentane | 0.40 |
| Benzene | 7.70 |
| Cyclohexane | 0.85 |
| $C_8$ olefins | 1.35 |

The foregoing rubber solvent, prior to use in the bromination process in accordance with the present invention, was contacted with solid aluminum chloride at room temperature until the bromine number of the solvent was below 0.1, e.g. about 10 minutes. The mixture was then filtered to remove solid components. A 13 weight percent solution of butyl rubber was then prepared with this treated solvent. Liquid bromine was then continuously added to the butyl rubber solution over a period of 10 minutes at 25° C. and under atmospheric pressure. A calculated 6 weight percent of bromine based on rubbery copolymer was added, 2.4% by weight of bromine combining with the copolymer in the 10 minute period, after which reaction was discontinued. The resulting solution of brominated butyl rubber, produced in solution in accordance with the present invention, was then water-washed three times to remove impurities. Upon precipitation with acetone and recovery, the brominated butyl rubber of the invention was compared to a commercial brominated butyl rubber, which latter rubber was prepared by milling undissolved butyl rubber with a solid brominating agent. The inspections of each rubber were as follows:

| Inspection | Example 1 | Commercial Brominated Butyl Rubber Control |
|---|---|---|
| Percent Bromine | 2.4 | 3.3 |
| Viscosity, Av. Mol Wt | 380,000 | [1] 144,000 |
| Gel in Diisobutylene | 0 | 26.0 |

[1] Determined on soluble rubber.

The above data show that the brominated butyl rubber of Example 1 of the present invention is gel-free as indicated by complete solubility in diisobutylene. The brominated rubber of the invention also has a considerably higher molecular weight than that of the commercial brominated butyl rubber produced by milling undissolved butyl rubber with a solid brominating agent. It will be noted that the molecular weight of the brominated butyl rubber of Example 1 of the invention is substantially the same as that of the unbrominated butyl rubber from which it was prepared. This shows that the process of the present invention results in the formation of a substantially undegraded brominated rubber.

One hundred parts by weight of each rubber were then compounded into the following formulation:

| Component: | Parts by weight |
|---|---|
| Carbon black (S.R.F.) | 50 |
| Zinc oxide | 5.0 |
| Sulfur | 2.0 |
| Tetramethylthiuramdisulfide | 0.5 |
| Benzothiazyldisulfide | 0.5 |
| Stearic acid | 0.5 |

The resulting compounded rubber stocks were then cured for 60 minutes at 307° F., their physical inspections being as follows:

| Inspection | Example 1 | Commercial Brominated Butyl Rubber Control |
|---|---|---|
| Tensile Strength (p.s.i.) | 1,730 | 1,310 |
| Elongation (percent) | 325 | 370 |
| Modulus at 300% Elongation (p.s.i.) | 1,700 | 1,150 |

The above data show that the brominated butyl rubber of Example 1 of the invention, when vulcanized with sulfur exhibits considerably improved tensile strength and higher extension modulus without significant loss in elongation compared to the commercial brominated butyl rubber control made by milling a solid brominating agent with undissolved butyl rubber.

Example 2

One hundred parts by weight each of the brominated rubber of Example 1 and the commercial brominated butyl rubber control were then compounded into the following formulation:

| Components: | Parts by weight |
| --- | --- |
| Carbon black (S.R.F.) | 50 |
| Zinc oxide | 5.0 |
| Stearic acid | 1.0 |

Each compounded rubber stock was then cured for 60 minutes at 307° F., their physical inspections being as follows:

| Inspection | Example 2 | Commercial Brominated Butyl Rubber Control |
| --- | --- | --- |
| Tensile Strength (p.s.i.) | 1,635 | 1,460 |
| Elongation (percent) | >300 | >300 |
| Modulus at 300% Elongation (p.s.i.) | 1,450 | 815 |

The above data show the brominated butyl rubber of Example 2 of the invention when vulcanized with zinc oxide exhibits improved tensile strength and much higher extension modulus compared to the commercial brominated butyl rubber.

Example 3

In order to demonstrate the fact that when employing a substantially saturated rubber solvent and particularly an aluminum-chloride treated rubber solvent, much higher molecular weight polymers are obtainable using otherwise the same reaction conditions and same reactants; the procedure as in Example 1 was repeated, the temperature of bromination being carefully maintained at 25° C. for a bromination time of 12 minutes. In a first sample (hereinafter referred to as "Sample A") the commercial rubber corresponding to GR-I 17 was dissolved in the untreated solvent of Example 1 prior to treating the solvent with solid aluminum chloride. In a second sample, the same rubber was dissolved in a solvent which had been treated with solid aluminum chloride substantially in the manner as in Example 1 so as to render the solvent substantially saturated (e.g. having a bromine number of 0.05).

Two samples of the GR-I 17 type commercial butyl rubber each dissolved in one of the foregoing respective solvents, each to a concentration of 13 parts by weight of rubber per 100 parts by weight of solvent, after bromination, as above mentioned for 12 minutes at a temperature of 25° C., showed the following viscosity average molecular weights:

| Sample "A" (Brominated in untreated solvent) | Sample "B" (Brominated in Aluminum Chloride treated solvent) |
| --- | --- |
| 235,000 | 315,000 |

The above data show that bromination of butyl rubber in solution in a solvent which has been rendered substantially saturated by aluminum chloride treatment results in a higher molecular weight product (315,000 viscosity average molecular weight) compared to the viscosity average molecular weight of butyl rubber brominated in an untreated unsaturated solvent (the molecular weight of the latter brominated rubber being only 235,000).

One particularly advantageous use for the improved bromine-containing isoolefin-multiolefin rubbery copolymers such as butyl rubber of the present invention is in pneumatic tires of either the inner tube-containing variety or in tubeless type tires.

Referring now to the drawings, Figure 1 depicts a pneumatic tubeless tire which comprises a hollow toroidal type member which is substantially U-shaped in cross section by virtue of an open portion which extends around the inner periphery of the member. In other words, the tire is of a tubeless type structure which has a cross-section in the form of an open-bellied body with spaced terminal portions to define a member generally resembling a horseshoe. The terminal portions constitute bead portions 11—11 of the tire inside of which are a plurality of bead wires, adhesively imbedded and molded in a rubber. The outer surfaces of the bead portions and/or rim 12 are advantageously formed into an air-sealing means, such as a plurality of ribs to aid in adhesion of the bead portions to the rim when the tire is inflated. The outer surface of the tire also includes tread area 13 and sidewalls 14. The open portion of the horseshoe-shaped tire faces that portion of the inner circumference of the tire which is adjacent the said tread area 13 of the tire.

The remaining construction of the tire may vary according to the conventional fabrication, but in general, the tire is a multi-layered type of structure with an outer layer as hereinbefore mentioned. The layer next adjacent the outer layer comprises a carcass 15 which includes a rubber having incorporated therein a fabric composed of a plurality of cotton, rayon, nylon, or steel cords. The tire also includes an inner lining 16, advantageously made from rubber; e.g., a bromine-containing isoolefin-multiolefin rubbery copolymer which has been produced in solution in accordance with the present invention and which has been at least partially vulcanized or covulcanized with other rubbery polymers for about one to 300 minutes or more at temperatures between about 100° and 450° F. This inner lining must be substantially impermeable to air. The above multi-layers, at least three in number, are conventionally bonded or otherwise adhered together, for example, by cementing and/or especially by vulcanizing to form a tire of a unitary structure.

The compositions comprising the brominated isoolefin-multiolefin-containing copolymers of the present invention may be employed generally throughout the tire and advantageously contain in admixture therewith about 0 to 50 weight percent based on brominated copolymer of such rubbery materials as GR-S rubber, Buna-N rubber, natural rubber, etc. For example, as heretofore mentioned, the inner lining 16 may comprise such a bromine-containing rubbery copolymer of the present invention. Alternatively, inner lining 16 may comprise unmodified butyl rubber or chlorinated butyl rubber which has been bonded to carcass 15 by an interposed tie-ply of a brominated isoolefin-multiolefin-containing copolymer of the invention which has been at least partially vulcanized or covulcanized with other rubbery polymers in the presence of polyvalent metal oxides such as zinc oxide and/or sulfur and/or sulfur-containing compounds and/or primary or polyfunctional amines and/or quinoid compounds such as paraquinone dioxime or paradinitrosobenzene. Such a tie-ply composition preferably also contains per 100 parts by weight of brominated isoolefin-multiolefin-containing copolymer, about 20 to 100 parts by weight of a filler such as carbon black and/or a mineral filler such as clay, silica, alumina, talc, or the like and may contain about 0.5 to 30 parts by weight of phenolic-aldehyde resins and/or about 0 to 20 parts by weight of phenol dialcohol resins of the polymethylol phenol type. Such an interposed tie-ply facilitates the inclusion of highly unsaturated rubbers such as natural rubber, GR-S rubber (rubbery diene-styrene copolymers), Buna-N rubber (rubbery diene-nitrile rubber), neoprene rubber (i.e., polychloro-alkadiene rubber), mixtures thereof, etc., in the carcass.

The other layers of the tire such as the carcass layer and/or the outer layer (including the tread area, sidewalls, outer bead portions, etc.) also advantageously comprise brominated isoolefin-multiolefin-containing copolymers, particularly brominated butyl rubber which have been produced in accordance with the present invention. Vulcalnization of the carcass, plies (if any) sidewalls and tread area is desirably accomplished by heating the same for times of between about 1 to 100, advantageously about 3 to 80, preferably about 10 to 60 minutes at temperatures between about 200° and 450° F., preferably between about 250° and 400° F. These layers may also contain, in addition to brominated isoolefin-multiolefin-containing copolymers of the present invention, other rubbery polymers covulcanized therewith, with or without such anti-oxidants as bisphenols, alkylated cresols, phenyl beta naphthylamine, etc.

The tubeless tire may also contain, in at least the trea area 13, an oil-extended high molecular weight (e.g., viscosity average molecular weight of above 900,000 to about 2,000,000 or higher) butyl rubber and/or the brominated butyl rubber of the invention and/or chlorinated butyl rubber which has been bonded to either a highly saturated or unsaturated rubber or mixture of rubbers in carcass 15 by an interposed tie-ply of a brominated isoolefin-multiolefin-containing copolymer, preferably brominated butyl rubber, produced in accordance with the present invention, which has been advantageously substantially completely vulcanized or covulcanized with other rubbery polymers.

The brominated butyl rubber copolymer of the present invention may also be used, as mentioned heretofore, for coating fabric or cords of tires. For example, according to a preferred embodiment of the present invention, automobile tire cords are coated first with an aqueous solution of a resinous phenolic-aldehyde condensation product, preferably a resorcinol-formaldehyde resin, and then coated with a cement comprising a solution of the brominated butyl rubber of the invention in a volatile solvent. For this use, the brominated butyl rubber, as above mentioned, contains at least 0.5 weight percent combined bromine but not more than about 3.0 combined atoms of bromine per double bond in the polymer. The cement also may contain a rubber pigment or filler such as carbon black, clays, silica, etc.; bivalent metal oxides (or hydroxides) such as ZnO, CaO or MgO; plasticizer oils, ultra accelerators, primary or polyfunctional amines, phenol-dialcohol resins, and/or anti-oxidants etc. The resulting coated cords when dried have been found to have much greater adhesion after vulcanization at 250–400° F. to butyl rubber and other rubbers in the carcass layers of tires.

*Example 4*

In order to demonstrate the advantage of brominated butyl rubber made in accordance with the present invention in coating tire cords, sixty grams of butyl rubber (GR–I 15) were dissolved in 960 grams of carbon tetrachloride. Two milliliters of liquid bromine were then added and reaction was allowed to ensue for one hour at room temperature. The brominated rubbery polymer formed in accordance with the present invention, was then precipitated by the addition of excess isopropyl alcohol. In place of isopropyl alcohol, other known non-solvents for butyl rubber may be employed such as $C_1$–$C_4$ alkanols, ketones such as acetone, etc. The rubbery polymer was then redissolved in hexane and reprecipitated with isopropyl alcohol. The brominated rubbery product (hereinafter referred to as Brominated butyl rubber "A") was then dried at 65° C. under a vacuum of 0.1–2.0 inches (e.g. 1.0 inch) of mercury absolute. The brominated product of the invention compared to the original unmodified polymer as follows:

| Original Polymer | Brominated Product |
|---|---|
| Iodine No., 11.6 (cg./g.) | Iodine No. (cg./g.), 4.87 2.93 wt. percent combined bromine |

Brominated butyl rubber "A" of the present invention was compounded in the following brominated butyl rubber cement containing 90 cc. of n-heptane and 10 grams of the following:

| Component: | Parts by weight |
|---|---|
| Brominated butyl rubber "A" | 100 |
| Pigment (EPC carbon black) | 50 |
| Mold release agent (stearic acid) | 1.0 |
| Anti-oxidant (phenyl beta naphthylamine) | 0.25 |
| Zinc oxide | 5.0 |

Rayon and nylon tire cords were first treated with aqueous solutions of resorcinol-formaldehyde resins having mole ratios of formaldehyde to resorcinol of 1/1 to 5/1 as tabulated hereinafter. The reaction between the resorcinol and the formaldehyde was at 25° C. for 48 hours. The resin concentration was 5 parts by weight of resin per 100 parts by weight of water. The cords were placed beneath the surface of the resin solution which had been aged for 48 hours and maintained in a beaker by a wire guide. The time of aging may be almost negligible up to about one month or more at room temperature up to about 200° F. The cord was then dried in a circulating air oven at 250° F. for 5 minutes.

The above brominated butyl rubber cement of the present invention was then applied by forcing the resin-coated cords beneath the surface of the cement by a wire guide and then passed through an air blast to remove excess cement. The cord was then redried for 5 minutes at 250° F.

The cords were then lodged in a vulcanizable unmodified butyl rubber matrix and vulcanized for 25 minutes at 320° F.; the matrix having the following composition:

| Ingredient: | Parts by weight |
|---|---|
| Butyl rubber (GR–I 17) | 100 |
| M.P.C. carbon black | 50 |
| Stearic acid | 0.5 |
| p-Dinitrosobenzene | 0.5 |
| Zinc oxide | 5.0 |
| Sulfur | 2.0 |
| Tellurium diethyl dithiocarbamate | 1.0 |
| Plasticizer hydrocarbon oil "A"[1] | 15.0 |

[1] The plasticizer hydrocarbon oil was a paraffinic base oil having the following characteristics:

| S.S.U. at 100° F | 110 |
|---|---|
| Pour point | ° F 30 |
| Flash point | ° F 365 |

The adhesions of the cords (coated in accordance with the invention) to the matrix were measured by a technique essentially similar to the "H" test described by Lyons, Conrad and Nelson, Rubber Chemistry and Technology, 268, vol. XX (1947). The tire cords used were rayon tire cords of 1650 denier 2 ply construction and nylon cords of 840 denier 2 ply construction. The test specimens were prepared with a ½ inch length of treated cord vulcanized into the center of a 1½ x ½ x ¼ inch butyl rubber matrix composition. The vulcanized rubber matrix was reinforced with light cotton duck on the two long sides from which the cord did not protrude. The force required to pull the ½ inch length of cord from the rubber block was measured by means of a Scott tensile tester at a 20 inches per minute jaw separation rate. The results were as follows:

| Cord | Rayon | | | | Nylon |
|---|---|---|---|---|---|
| Cord No. | 1 | 2 | 3 | 4 | 5 |
| Mol ratio (formaldehyde/resorcinol) | 1/1 | 3/1 | 4/1 | 5/1 | 3/1 |
| Resorcinol, g | 6 | 6 | 5 | 5 | 6 |
| 37% formaldehyde (cc.) | 4.06 | 12.2 | 13.6 | 16.9 | 12.2 |
| NaOH, 1%, cc | 12 | 12 | 10 | 10 | 12 |
| Water, cc | 130 | 187 | 179 | 205 | 187 |
| "H" Test Adhesion Results (Adhesion in pounds at room temperature) | 20.3 | 16.3 | 17.6 | 19.9 | 13.4 |

The above data indicates that superior adhesion is obtained in all instances when employing the brominated butyl rubber cements of the present invention in conjunction with resorcinol-formaldehyde resins. Maximum values of about 5–7 pounds for nylon and 13–15 pounds for rayon were obtainable heretofore using unmodified butyl rubber cements in conjunction with resorcinol-formaldehyde resins.

The intermediate or carcass layer including a rubber and a plurality of fibrous cords and/or fabric, must be of both desirable rigidity and strength. The performance of this layer is therefore dependent upon the bond or adhesion between the cords or fabric and the rubber. Certain synthetic rubbers (and especially butyl rubber) do not normally have good adhesion to such fibrous materials, particularly if they are synthetic such as rayon, polyacrylonitrile and especially nylon. The present invention has solved this difficulty and provides a strong bond between such synthetic olefin-multiolefin copolymers as butyl rubber and such fibers as the foregoing by using a coating layer composition comprising an essentially undegraded substantially gel-free brominated butyl rubber, and by employing the coating techniques as hereinbefore described.

The expression "layer" as employed in the claims is intended to include plies, laminates, cement layers, tread base, and liners as well as such layers as the carcass, sidewalls, tread area, etc., of tires.

Figure 2:
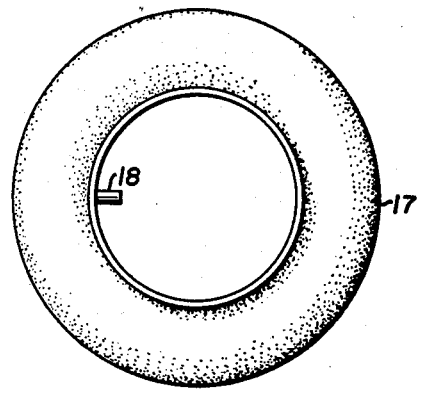
Fig. 2 is a view in side elevation of a tire casing curing bag, formed of a material comprising a modified copolymer in accordance with the present invention.

Another advantageous use for the brominated isoolefin-multiolefin-containing copolymers, particularly brominated butyl rubber of the present invention is in the manufacture of curing bags, particularly tire casing curing bags. Figure 2 of the accompanying drawings illustrates a tire casing curing bag made of such a brominated isoolefin-multiolefin-containing copolymer which has been produced in accordance with the present invention and which has been advantageously compounded into the following recipe or its equivalent:

| Component | Parts by Weight | |
|---|---|---|
| | Typical Range | Preferred Range |
| Brominated isoolefin-multiolefin copolymer | 100 | 100 |
| Phenolic-aldehyde resin | 0–30 | 1.0–15 |
| Stabilizer | 0–20.0 | 0.5–10 |
| Zinc Oxide [1] | 2–30 | 5–15 |
| Phenol dialcohol resin (i.e. 2,6-dimethylol-4-cyclohexyl phenol resin) | 0–20.0 | 0.5–15.0 |
| Die anti-tack agent (e.g. stearic acid) | 0–5 | 0.5–2.0 |
| Filler [2] | 30–80 | 40–60 |
| N-substituted thiocarbamic acid derivative (bismuth dimethyl dithiocarbamate) | 0–3.0 | 0.1–2.0 |

[1] The zinc oxide may be at least partially replaced by a zinc salt of a weak fatty acid, examples of which are zinc stearate, zinc laurate, etc.
[2] The filler advantageously comprises any suitable non-oxy carbon black such as furnace or thermal blacks and/or mineral fillers such as clays, talc, alumina, silica, diatomaceous earth, etc.

The above compounded stock is shaped into the form of curing bag 17 in accordance with conventional practice and is then cured in a mold at temperatures between about 280° and 350° F. for a period of time ranging between about 10 minutes and 2 hours, the lower the temperature the longer the curing time and vice versa as is conventional vulcanization practice. Referring again to Figure 2, tire casing curing bag 17 is of an annular toroidal form having an external shape corresponding approximately to the interior contour of the pneumatic tire casing or inner liner to be cured thereon, and is equipped with the usual connecting valve 18 by means of which a heated fluid under pressure, such as hot water and/or steam is introduced into the interior cavity of the bag during the vulcanization of the tire. The tire curing bag is thereby expanded, causing the tire to conform closely to the surfaces of the mold cavity in which the tire is vulcanized. A tire curing bag generally has a wall thickness between about 0.5 to 3.0, preferably about 1.0 to 2.5 inches. Such a curing bag, produced in accordance with the present invention, is superior to conventional curing bags in its resistance to deteriorating influences.

Figure 3:
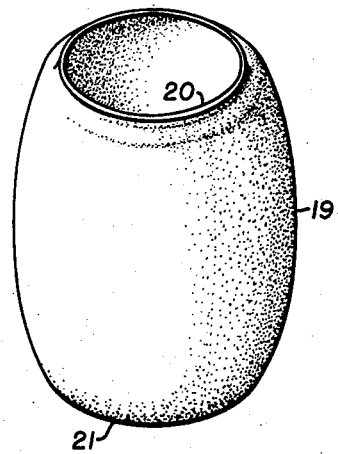
Fig. 3 is a perspective view of a tire casing curing diaphragm or bladder as provided in the structure of a Bag-O-Matic press and containing therein a modified copolymer in accordance with the present invention.

The brominated isoolefin-multiolefin-containing rubbery copolymers of the present invention are also advantageously used in making tire casing curing diaphragms or bladders in Bag-O-Matic presses. Figure 3 shows such a hollow cylindrical curing bladder or diaphragm 19 useful in a Bag-O-Matic tire press. The top 20 and bottom 21 of the diaphragm are sealed when in position on the press by a combination of bead and clamping rings (not shown) which also form the bead area of the tire mold. A Bag-O-Matic tire press is illustrated and described on pages 314 and 318 to 319 in "Machinery and Equipment for Rubber and Plastics," volume 1; "Primary Machinery and Equipment" (1952, compiled by R. G. Seaman and A. M. Merrill) to which reference may be had for further details. Compounding of the brominated butyl rubber of the invention for use in vulcanized curing diaphragms is essentially the same as for tire curing bags outlined above.

Other embodiments of the present invention comprise the use of brominated isoolefin-multiolefin-containing copolymers of the invention, particularly brominated butyl rubber in conveyor belting and steam hose. The excellent heat-aging resistance properties of brominated isoolefin-multiolefin rubbery copolymers of the present invention make such copolymers particularly adaptable for use in steam hose and conveyor belting where, in each instance, the transport of hot materials is involved.

Figure 4:
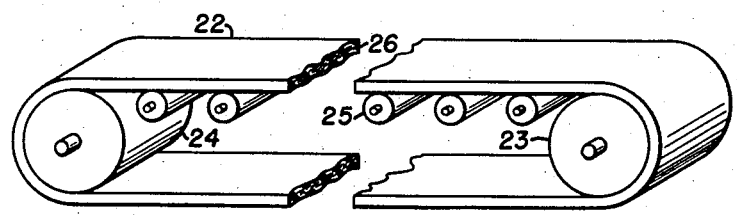
Fig. 4 is a generally edgewise perspective view of a conveyor belt structure in which the belt is formed of a modified copolymer material in accordance with the present invention.

Figure 4 shows a conveyor belt 22 containing a brominated rubbery isoolefin-multiolefin-containing copolymer which has been produced in accordance with the present invention, said belt being in position on drive roller 23, idle roller 24, and idle support rollers 25. The belt may consist wholly of the brominated isoolefin-multiolefin-containing rubbery copolymer, particularly brominated butyl rubber, made in accordance with the present invention, but preferably contains imbedded therein a fabric 26 composed of a plurality of plys of cotton, rayon, nylon or steel filaments, cords or threads. A suitable formulation for compounding brominated isoolefin-multiolefin-containing copolymers of the present invention for use in either conveyor belting or in steam hose is as follows:

| Component | Parts by Weight | |
|---|---|---|
| | Typical Range | Preferred Range |
| Brominated isoolefin-multiolefin copolymer | 100 | 100 |
| Phenolic-aldehyde resin | 0–30 | 1.0–20 |
| Stabilizer | 0–20.0 | 0.5–10.0 |
| Zinc Oxide [1] | 2–30 | 5–15 |
| Phenol dialcohol resin (e.g. 2,6-dimethyl-4-phenyl phenol resin) | 0–15.0 | 1–10.0 |
| Die anti-tack agent (e.g. stearic acid) | 0–5 | 0.5–2.0 |
| N-substituted thiocarbamic acid derivative (tellurium diethyl dithiocarbamate) | 0–3.0 | 0.1–2.0 |
| Filler [2] | 40–120 | 50–80 |

[1] The zinc oxide may be at least partially replaced by a zinc salt of a weak fatty acid, examples of which are zinc stearate, zinc laurate, etc.
[2] The filler may comprise oxy or non-oxy carbon blacks such as channel, furnace or thermal blacks and/or mineral fillers such as clays, talc, alumina, silica, silica-alumina, diatomaceous earth, etc.

Figure 5:
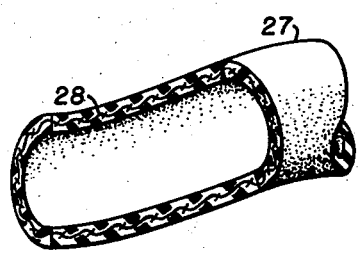
Fig. 5 is a perspective view, partly in section, of a portion of a typical steam hose formed of a composition comprising a modified copolymer in accordance with the present invention.

Figure 5 shows a central longitudinal section broken away of a flexible rubber steam hose 27 produced in accordance with the present invention. Again, as in the case of the conveyor belt, the steam hose may consist wholly of the brominated butyl rubber of the invention, but preferably contains imbedded therein a cotton, rayon, nylon, or steel fabric 28.

The compositions comprising brominated olefin (or isoolefin)-multiolefin rubbery copolymers, particularly brominated butyl rubber which have been produced in accordance with the present invention, may be employed alone or in admixture with other rubbers for a wide variety of applications other than those mentioned hereinbefore such as in electrical insulation, inner tubes, blown sponge rubber, car window channel strips, whole tires, proofed goods, general mechanical goods, and other applications where unmodified butyl rubber, chlorinated butyl rubber, and/or certain chloroalkadiene rubber homopolymers or copolymers have utility.

Resort may be had to various modifications and variations of the disclosed embodiments and examples without departing from the spirit of the invention or the scope of the appended claims.

What is claimed is:

1. A process for producing a substantially gel-free rubber of improved molecular weight which comprises brominating at a temperature between about −30° and +100° C. with bromine a solution in a saturated aluminum chloride treated hydrocarbon solvent having a bromine number less than about 0.2, of an unvulcanized isoolefin-multiolefin butyl rubber copolymer of 85 to 99.5 weight percent of a $C_4$ to $C_8$ isoolefin and 15 to 0.5 weight percent of a $C_4$ to $C_{14}$ multiolefin to contain at least about 0.5 weight not more than about three combined atoms of bromine per double bond in the copolymer, the resulting brominated butyl rubber having a viscosity average molecular weight of at least about 315,000, and being substantially gel-free as indicated by complete solubility in diisobutylene.

2. Process according to claim 1 in which the solvent comprises at least one substantially saturated aluminum chloride treated $C_5$ to $C_7$ hydrocarbon; the ratio between the solvent and dissolved butyl rubber being between about 20–99:80–1 weight percent, respectively.

3. Process according to claim 1 in which the hydrocarbon solvent comprises aluminum chloride treated n-hexane.

4. A process for brominating a copolymer of 85 to 99.5 weight percent of $C_4$ to $C_8$ isoolefin and 15 to 0.5 weight percent of a $C_4$ to $C_{14}$ multiolefin which comprises dissolving said copolymer in a saturated aluminum chloride treated hydrocarbon solvent and brominating said copolymer at a temperature of −30° to 100° C. with bromine until it contains at least 0.5 weight percent bromine but not more than about three combined atoms of bromine per double bond in the copolymer.

5. A process for producing a brominated butyl rubber substantially gel-free, as indicated by complete solubility in diisobutylene, and of high molecular weight, which comprises dissolving a butyl rubber copolymer of 85 to 99.5 weight percent isobutylene and 15 to 0.5 weight percent of isoprene having an 8-minute Mooney viscosity at 212° F. of at least about 67 and a mole percent unsaturation of not more than about 1.7, in a saturated volatile $C_6$ hydrocarbon solvent having a bromine number below about 0.1, adding liquid bromine to the resulting butyl rubber solution over a period of about 10 minutes at about 25° C. to about 70° C. and at atmospheric pressure, the total weight of bromine added being about 1 to 6 weight percent based on the butyl rubber, then washing the resulting solution, and recovering from the washed solution a brominated butyl rubber having about 0.5 to 2.4% of combined bromine, and a viscosity average molecular weight of about 315,000 to 380,000, and being gel-free as indicated by complete solubility in diisobutylene.

References Cited in the file of this patent

UNITED STATES PATENTS

| | | |
|---|---|---|
| 2,211,951 | Hershberger | Aug. 20, 1940 |
| 2,354,426 | Briant | July 25, 1944 |
| 2,631,984 | Crawford | Mar. 17, 1953 |
| 2,720,479 | Crawford | Oct. 11, 1955 |
| 2,816,098 | Morrissey | Dec. 10, 1957 |
| 2,806,833 | Leeper | Sept. 17, 1957 |